Figure 1:
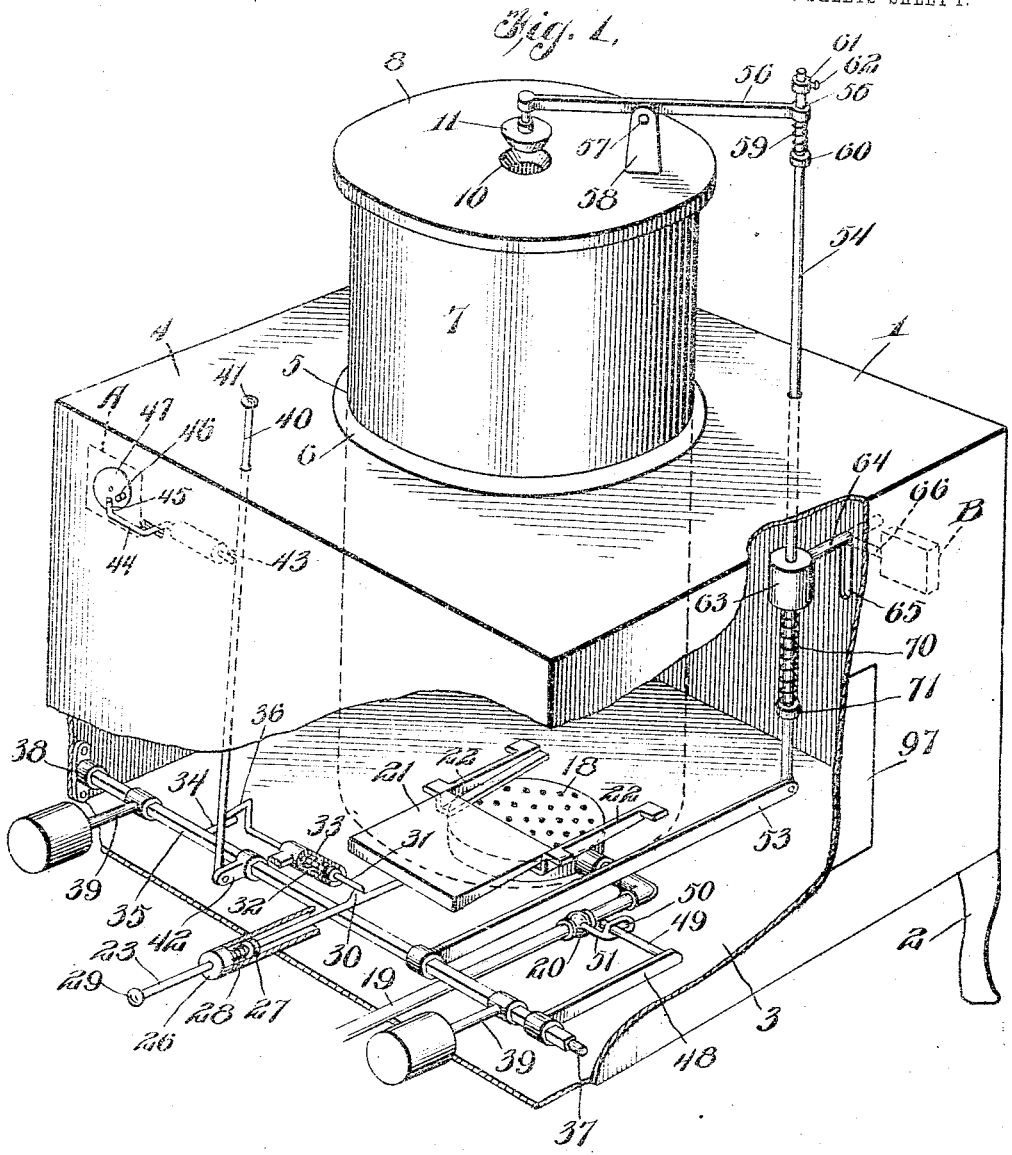

W. E. COYLE-IRVING.
FIRELESS COOKER.
APPLICATION FILED MAR. 30, 1914.

1,129,050.

Patented Feb. 16, 1915.
3 SHEETS—SHEET 1.

Witnesses

Inventor
William Edwin Coyle-Irving
By
Attorney

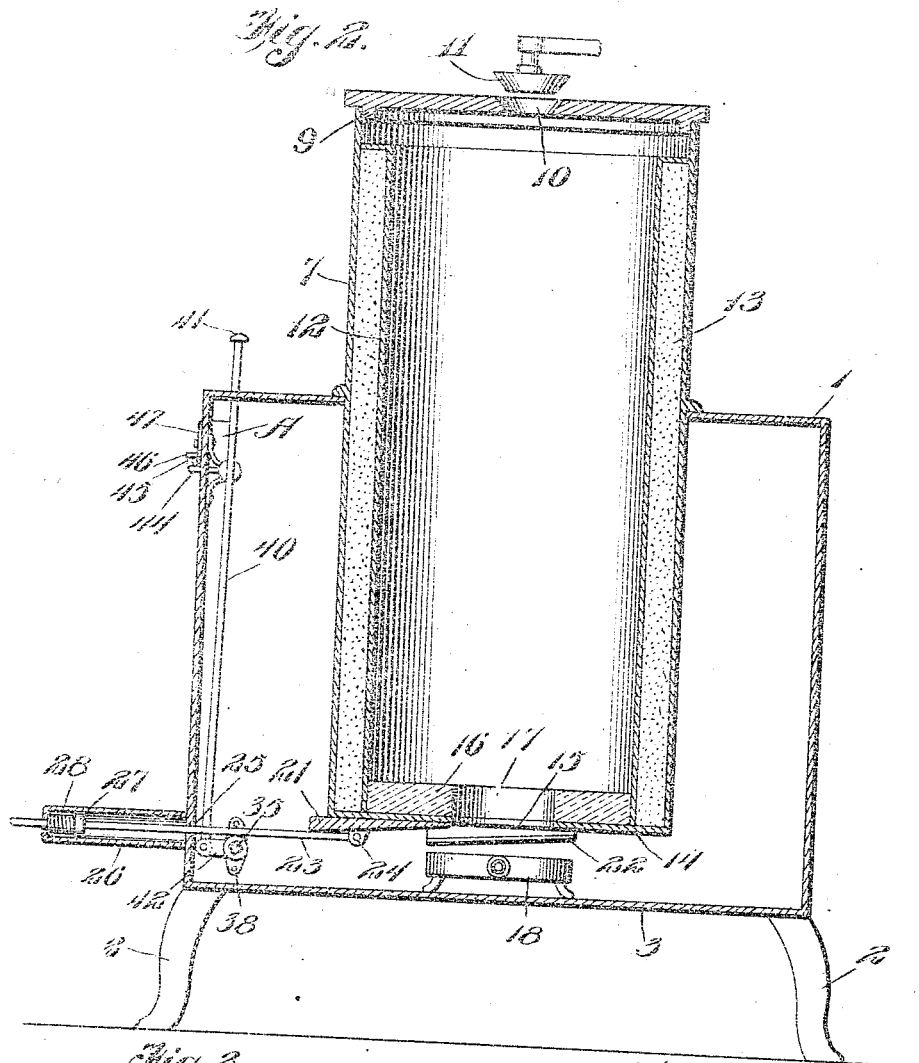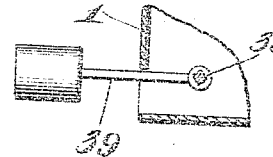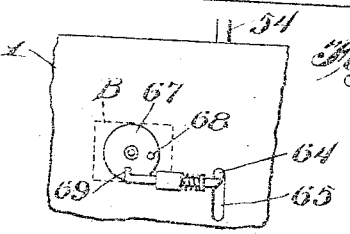

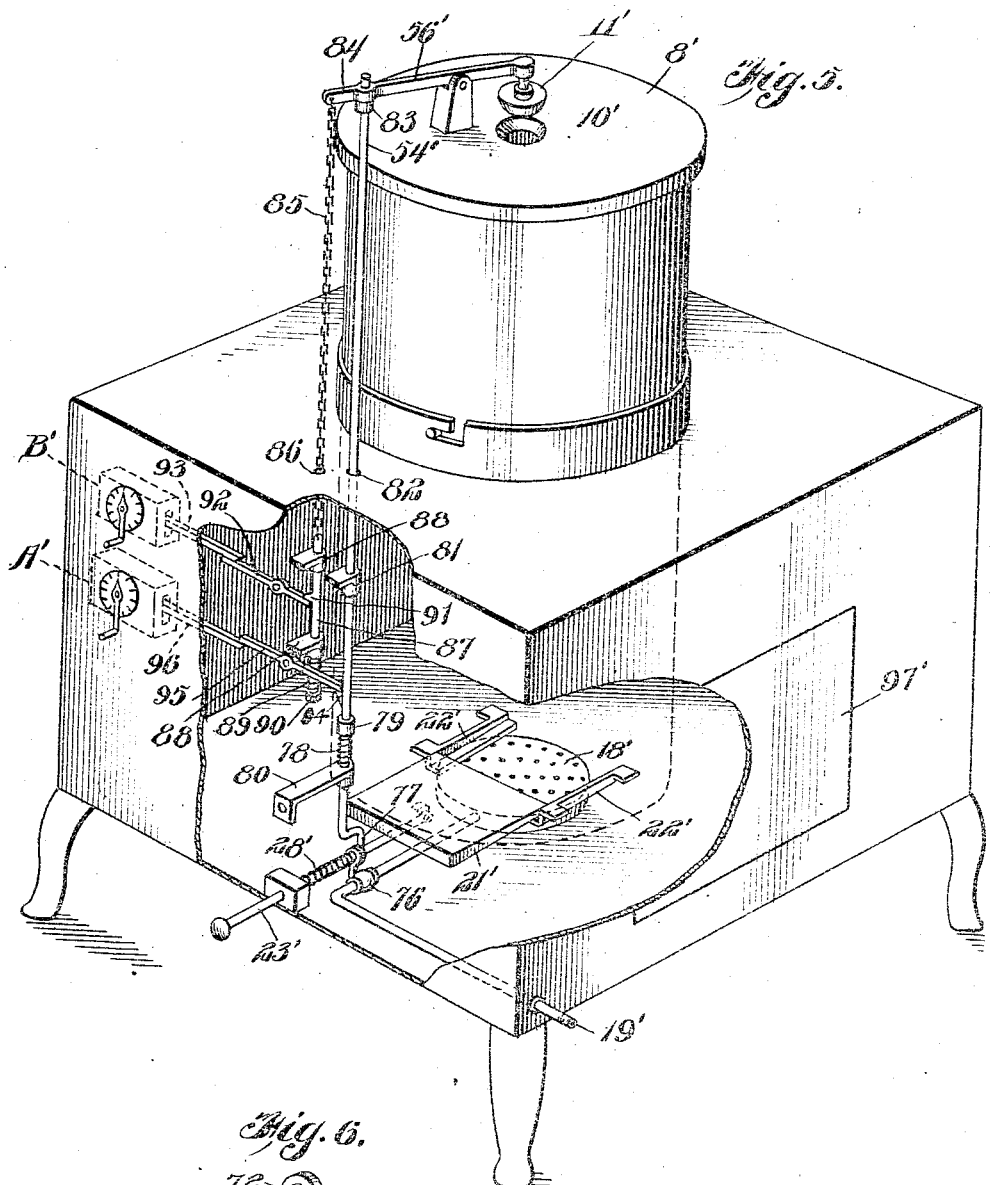

UNITED STATES PATENT OFFICE.

WILLIAM EDWIN COYLE-IRVING, OF NEW HAVEN, CONNECTICUT, ASSIGNOR TO
CLIFFORD BARGAMIN, OF NEWPORT NEWS, VIRGINIA.

FIRELESS COOKER.

1,129,050.

Specification of Letters Patent.

Patented Feb. 16, 1915.

Application filed March 30, 1914. Serial No. 828,245.

*To all whom it may concern:*

Be it known that I, WILLIAM EDWIN COYLE-IRVING, a subject of the King of Great Britain, residing at New Haven, in the county of New Haven and State of Connecticut, have invented new and useful Improvements in Fireless Cookers, of which the following is a specification.

This invention relates to automatic fireless cookers, the object in view being to produce a cooker of the class referred to embodying in combination with a food receptacle or container, a heater having a fixed relation thereto and means for automatically cutting off the heat from the food container and sealing said container, said means being operated automatically at a predetermined time.

A further object of the invention is to provide means whereby a vent is opened in the food container automatically and at a predetermined time for the purpose of terminating the cooking operation and preventing overcooking.

A further object of the invention is to provide mechanism for automatically cutting off the heat at a predetermined time simultaneously with the sealing of the food container thereby conserving the fuel.

A further object of the invention is to provide a fireless cooker of such construction that it may be preheated by a heater adapted to be fed with gasolene or any hydrocarbon liquid fuel or gas.

A further object of the invention is to provide a cooker of the class described which may be easily and economically manufactured.

With the above and other objects in view, the invention consists in the novel construction, combination and arrangement of parts, as will be hereinafter more fully described, illustrated and claimed.

In the accompanying drawings: Figure 1 is a broken perspective view of a fireless cooker embodying the present invention in its preferred form. Fig. 2 is a vertical section through the same taken diametrically of the food container. Fig. 3 is a fragmentary vertical section through one side of the casing showing the rock shaft and one of the weights for operating the same. Fig. 4 is a fragmentary elevation showing the means for tripping and releasing the weight which opens the vent. Fig. 5 is a view similar to Fig. 1 showing other mechanism for producing the same result. Fig. 6 is a fragmentary perspective view showing the means for cutting off the supply to the heater.

Referring to the drawings 1 designates a casing preferably of sheet metal and of such form as to contain the mechanism hereinafter described and also forms a support for the several parts and elements of the mechanism. This casing is supported at a suitable elevation by means of legs 2 extending from the bottom 3 thereof downwardly while the top 4 of the casing is formed with a central circular opening 5 bounded by a flange 6. Within this opening 5 is placed a food container 7 which is preferably cylindrical in shape and provided with a lid or cover 8 which is flanged as shown at 9 to fit within the top of the container 7, said cover being provided with a vent 10 shown as formed in the center of the cover, said vent being adapted to be closed by a movable vent stopper 11 the operating means for which will be hereinafter particularly described.

As shown in Fig. 2, the container is of double walled construction, comprising an outer wall to which the reference numeral 7 is applied and an inner wall 12 leaving an annular space in which is an insulating packing 13 to conserve the heat within the food container. In its bottom wall 14 the food container is formed with a central heat intake orifice 15, 16 designating a radiator such as a stone which rests in the bottom of the food container and is formed with a central heat intake orifice 17 in line with the orifice 15 of the container. Upon the bottom 3 of the casing 1 is placed a heater 18 which is situated directly under the intake orifices 15 and 17 just referred to, said heater having a fixed relation to the bottom of the food container and having connected therewith a supply pipe 19 which is provided with a stop cock 20 by means of which said pipe 19 may be opened and closed by the mechanism hereinafter described.

21 designates a slidable closure which is adapted to cover and close the intake orifice of the food container. This closure may be made of any suitable material, preferably asbestos and is substantially wedge-shape in cross section as illustrated in Figs. 1, 2 and 5, said closure operating in conjunction with a pair of flanged guides 22 secured to the bottom of the food container to crowd said closure tightly against the bottom of the container when said closure is slid across said intake orifice by the means to be described.

A plunger rod 23 is attached at one end to the closure 21 at the point 24 and extends outwardly through an opening 25 in the casing and through a tubular casing 26 where it is provided with a collar 27 fast thereon, beyond which is an expansion spring 28 which is coiled around the plunger rod 23 and exerts an inward pressure thereon to slide the closure 21 to its closing position. The rod 23 is provided at its outer end with an operating knob 29 to facilitate drawing said plunger outward and moving the closure 21 to an open position. The plunger rod 23 is provided with a catch, lip or shoulder 30 at a suitable point in the length thereof, said shoulder being adapted to be engaged by a sliding bolt or spring catch 31 which as shown in Fig. 1 passes through a tubular guide 32 in which is arranged a coiled spring 33 which acts to draw the bolt or catch 31 out of engagement with the shoulder 30 to permit the spring 28 to act for the purpose of thrusting the closure 21 across the intake orifice of the food container. The spring catch or bolt 31 is held in engagement with the shoulder 30 by means of a trip finger 34 on a rock shaft 35, the finger 34 engaging and lying behind another finger 36 on the bolt or spring catch 31 as clearly shown in Fig. 1. When the shaft 35 is rocked by the means hereinafter described, the finger 36 is released thus allowing the spring catch or bolt 31 to move out of engagement with the shoulder 30 and release the spring actuated closure 21. The plunger rod 23 is drawn outwardly by hand to reopen the closure 21 and reset the mechanism referred to.

The rock shaft 35 is preferably non-circular in cross section, the extremities thereof being reduced and rounded to form journals 37 which are received in bearings 38 supported by the casing 1. The rock shaft 35 is oscillated to turn in one direction by means of one or more weighted arms 39 and is moved in the opposite direction by a trip rod 40 having a knob 41 at its upper end where it projects above the top wall of the casing 1. At its lower end the rod 40 is pivotally connected to an arm 42 of the rock shaft 35. Intermediate its ends the rod 40 is provided with a shoulder 43 which is engaged by a spring pressed bolt 44 having the rear end thereof bent as shown at 45 to lie in the path of a stud or projection 46 on the revolving dial 47 of timing or clock mechanism designated generally at A and supported by the casing 1. The timing mechanism A may be set at any point desired so that after a certain predetermined lapse of time the stud or projection 46 will operate to withdraw the bolt 44 from engagement with the shoulder 43 of the trip rod 40, allowing the weighted arms 39 to move downwardly and oscillate the rock shaft 35. In this movement of the rock shaft, the spring catch 31 is retracted so as to disengage the shoulder 30 and allow the closure 21 to be moved to its closed position thereby sealing the intake opening in the bottom of the container. The rock shaft 35 is provided with a valve operating arm 48 carrying at its end a pin 49 which is received in the slotted extension 50 of the stem or arm 51 of the stop cock 20. Therefore as the shaft 35 is turned by the weighted arms 39, the stop cock 20 is closed, thus cutting off the supply to the heater 18 simultaneously with the shutting of the closure 21. A longer operating arm 53 fast on the rock shaft 35 has connected to the extremity thereof a vertically extending vent stopper operating rod 54 which extends through the top of the casing 1 and also through an opening 55 in a stopper operating lever 56 which is fulcrumed intermediate its ends at 57 on a post 58 extending upwardly toward the cover 8 of the food container, the vent stopper 11 being connected to the inner arm of the lever 56 as shown in Figs. 1, 2 and 5 so that in the movements of the lever 56 the stopper 11 is moved to close and open the vent 10.

59 designates a compensating spring which is interposed between the lever 56 and a fixed collar 60 on the operating rod 54 so as to admit of any necessary movement of the rod 54 after the stopper 11 has been moved to its closed position. Above the lever 56 the operating rod 54 is provided with a lever operating collar 61 adjustable thereon by means of a set screw 62 so that when the rod 54 moves downwardly, the stopper 11 is moved away from the vent 10 so as to open the latter.

The means for operating the rod 54 to open the vent 10 preferably consists of a weight 63 mounted slidingly on the rod 54 and provided with a setting arm 64 which projects through a slot 65 in the casing as shown in Fig. 1 where it is upheld by a spring retracted bolt or catch 66 operating at a predetermined time by timing or clock mechanism designated generally at B and best illustrated in Fig. 4 wherein it will be seen that the mechanism B like the mechanism A comprises a revolving dial 67 carrying a stud or projection 68 adapted to engage a shoulder 69 on the bolt 66 to draw the same from under the weight setting arm 64.

It will be seen from the foregoing description that when the rod 40 is released by the spring pressed bolt or catch 44, the weighted arms 39 act to partially turn the rock shaft 35. This causes the plunger rod 23 to be released and thereupon the sliding closure 21 moves across and seals the intake orifice in the bottom of the food container. Simultaneously therewith the stop cock 20 is closed by the operation of the arm 48 on said rock shaft and also simultaneously with both of these operations, the operating rod 54 is pushed upwardly and the vent 10 is closed by the stopper 11. Thus the heat is cut off and the food container sealed at a predetermined time which is regulated by the setting of the timing mechanism A. Subsequently to this combined operation, the weight 63 is released at a predetermined time by the operation of the timing mechanism B and said weight moves downwardly on the rod 54, being gradually arrested by a cushioning spring 70 until it acts against a fixed collar 71 on said rod, whereupon the rod 54 is carried downwardly until the collar 61 acts on the lever 56 to move the stopper 11 away from the vent 10. This allows the heat to escape from the food container and arrests cooking.

Under the arrangement illustrated in Figs. 5 and 6, the weighted arms 39 above referred to for operating the rock shaft 35 are dispensed with and the vent stopper operating rod 54' is so located and arranged with respect to the plunger rod 23' that it acts to hold the plunger rod outwardly. For this purpose the plunger rod 23' is provided with a stop shoulder 72 fast thereon and having an L-shaped finger 73 which in the inward movement of the plunger rod 23', comes in contact with an arm 74 on the stem 75 of the stop cock 76 which controls the supply to the heater 18' thereby cutting off the supply to the heater. The lower end of the operating rod 54' is provided with a trip finger 77 which engages behind the collar 72 to hold the plunger rod 23' outwardly against the action of the closure shutting spring 28'. When, however, the rod 54' is thrust upwardly by the action of a coiled expansion spring 78, the finger 77 is moved out of engagement with the collar 72 to release the plunger rod 23' and the slidable closure 21' for the purpose hereinabove described. The spring 78 is interposed between a fixed collar 79 on the rod 54' and a guide 80 fastened to the casing 1. The rod 54' also passes through another guide 81 on the inside of the casing 1 and also through a guide opening 82 in the top wall of said casing upwardly to the stopper operating lever 56' which carries the vent stopper 11' for closing the vent 10' in the cover 8'.

83 designates a collar fast on the rod 54' which comes in contact with the lever 56' to move the stopper 11' to its closed position. Under the arrangement shown in Fig. 5, the lever 56' is extended at 84 to receive a flexible connection 85 which extends downwardly through an opening 86 in the top wall of the casing and has connected to its lower end a trip rod 87 which slides vertically through guides 88 on the inside of the casing 1. The rod 87 is normally forced down by a coiled expansion spring 89 which is interposed between a shoulder 90 on the lower end of said rod and one of the guides 88 as shown in Fig. 5. The rod 87 is provided with a shoulder 91 which is engaged by a trip lever 92 in turn engaged by a trip arm 93 of the timing mechanism indicated generally at B' and having the same purpose as the timing mechanism indicated at B in the foregoing description relating to Figs. 1 to 4 inclusive. The rod 54' is likewise provided with a shoulder 94 which is engaged by a trip lever 95 in turn engaged and operated by an arm 96 of another timing device or clock mechanism designated generally at A' and corresponding in function with the timing mechanism A shown in Fig. 1.

The operation of the mechanism shown in Fig. 5 is as follows: At a predetermined time governed by the setting of the timing mechanism A', the rod 54' is released and pushed upwardly by the spring 78. This releases the plunger rod 23' and allows the slidable closure 21' to move inwardly to its closing position. Simultaneously therewith the finger 73 operates to close the stop cock 76 and cut off the supply to the heater. Simultaneously with both of these operations, the lever 56' is operated to move the stopper 11' into position to close the vent 10'. Subsequently thereto and after a lapse of time governed by the setting of the timing mechanism B', the rod 87 is released and allowed to move downwardly thereby pulling on the flexible connection 85 and moving the lever 56' so as to shift the stopper 11' away from the vent 10' thus opening the vent and stopping the cooking operation.

Under both arrangements hereinabove described it will now be seen that the initial clock mechanism may be set to trip the mechanisms related thereto and thereupon the heater will be cut out. the intake orifice in the bottom of the food container will be sealed and the vent in the top of the food container will also be sealed. Thereafter and at a predetermined time governed by the setting of the secondary timing mechanism, the vent in the top of the container will be reopened thereupon terminating the cooking operation and preventing overcooking. A door 97' in one of the vertical walls of the casing 1 provides access to the interior of said casing for the purpose of lighting the burner which may be used as the heater hereinabove described and for setting any part of the mechanism described.

Under the arrangement shown in Fig. 1, the rod 40 is drawn upwardly to the position shown therein and the plunger rod 23 is then drawn outwardly until the spring catch 31 is moved into engagement therewith and held by the trip finger 34. This movement of the rock shaft 35 also opens the vent 10 and the stop cock 20. The burner 18 is then lighted and the door 97 closed. The timing mechanism A is then set to trip the mechanism after a certain predetermined time and the timing mechanism B is also set to operate at a subsequent time to stop the cooking operation by opening the vent at the top of the container.

Under the arrangement shown in Fig. 5, the plunger rod 23' is drawn outwardly and the rod 54' moved downwardly until it engages and holds said plunger rod 23'. The trip rod 87 is then drawn upwardly until it is engaged by the trip lever 93. The stop cock 76 is then opened and the burner 18' lighted. After a predetermined time the rod 54' is released and in moving upwardly it releases the plunger rod 23' and the closure 21' and also operates on the lever 56' to close the vent opening 10. Simultaneously therewith the stop cock 76 is closed thus cutting off the supply to the heater. Subsequently thereto the other timing mechanism operates at a predetermined time to automatically release the trip rod 91 which thereby effects an opening of the vent 10' through the medium of the flexible connection 85 and the lever 56'.

What I claim is:—

1. In a fireless cooker, a food container having a heat receiving orifice, means for delivering heat through said orifice into said container, and a closure slidable across said orifice and operable automatically to close said orifice at a predetermined time.

2. In a fireless cooker, a food container having a heat receiving orifice, means for supplying heat to said container through said orifice, a closure slidable across said orifice, and means operating automatically to move said closure to closing position at a predetermined time.

3. In a fireless cooker, a food container having a heat receiving orifice, means for supplying heat to said container through said orifice, and means for automatically closing said orifice at a predetermined time, said means embody a self-wedging slide.

4. In a fireless cooker, a food container having a heat receiving orifice, means for supplying heat to said container through said orifice, means for automatically closing said orifice at a predetermined time, said means embodying a slidable closure, and means for crowding said closure against the food container.

5. In a fireless cooker, a food container having a heat receiving orifice, a heater fixed in relation to said container, a supply pipe for said heater, and means for automatically closing said orifice and closing said supply pipe at a predetermined time.

6. In a fireless cooker, a food container having a heat receiving orifice and a vent, means for supplying heat to said container through said orifice, means operating to automatically close said orifice and vent at a predetermined time, and means operating thereafter to open said vent at a predetermined time.

7. In a fireless cooker, a food container having a vent therein, means for automatically closing said vent at a predetermined time, and means operating thereafter to reopen said vent at a predetermined time.

8. In a fireless cooker, a food container having a heat receiving orifice and a vent, means for automatically closing said orifice and vent at a predetermined time, and means operating thereafter to reopen said vent at a predetermined time.

9. In a fireless cooker, a food container having a vent therein, a heater, means for automatically closing said vent and shutting off the heater at a predetermined time, and means operating thereafter to reopen said vent at a predetermined time.

In testimony whereof I affix my signature in presence of two witnesses.

WILLIAM EDWIN COYLE-IRVING.

Witnesses:
Mrs. L. B. IRVING,
Mrs. L. HAHN.